United States Patent
Tan

(10) Patent No.: US 9,965,400 B2
(45) Date of Patent: May 8, 2018

(54) MEMORY MANAGEMENT METHOD, MEMORY CONTROL CIRCUIT UNIT AND MEMORY STORAGE DEVICE

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 98 days.

(21) Appl. No.: 15/140,500

(22) Filed: Apr. 28, 2016

(65) Prior Publication Data

US 2017/0269873 A1     Sep. 21, 2017

(30) Foreign Application Priority Data

Mar. 16, 2016  (TW) .............................. 105108029 A

(51) Int. Cl.
*G06F 12/00* (2006.01)
*G06F 12/121* (2016.01)
(Continued)

(52) U.S. Cl.
CPC .......... *G06F 12/121* (2013.01); *G06F 3/0619* (2013.01); *G06F 3/0656* (2013.01); *G06F 3/0679* (2013.01); *G06F 3/0688* (2013.01); *G06F 12/0246* (2013.01); *G06F 12/0253* (2013.01); *G06F 12/1009* (2013.01); *G06F 2212/1044* (2013.01); *G06F 2212/2022* (2013.01); *G06F 2212/69* (2013.01); *G06F 2212/7201* (2013.01); *G06F 2212/7205* (2013.01)

(58) Field of Classification Search
CPC .... G06F 3/0659; G06F 3/0619; G06F 3/0679; G06F 12/0246; G06F 12/0253; G06F 12/1009; G06F 12/121; G06F 2212/1044; G06F 2212/2022; G06F 2212/69; G06F 2212/7201; G06F 2212/7205

See application file for complete search history.

(56) References Cited

U.S. PATENT DOCUMENTS

2009/0089481 A1* 4/2009 Kapoor ............... G06F 12/0246
                                                                711/103
2011/0099325 A1* 4/2011 Roh ....................... G06F 3/0619
                                                                711/103

FOREIGN PATENT DOCUMENTS

| CN | 103207799 | 7/2013 |
| CN | 104346292 | 2/2015 |
| TW | 201329700 | 7/2013 |

OTHER PUBLICATIONS

"Office Action of Taiwan Counterpart Application", dated Mar. 7, 2017, p. 1-p. 8.

* cited by examiner

*Primary Examiner* — Shawn X Gu
(74) *Attorney, Agent, or Firm* — JCIPRNET

(57) ABSTRACT

A memory management method for a rewritable non-volatile memory module is provided. The memory management method includes using a first management mode to manage the rewritable non-volatile memory module after the rewritable non-volatile memory module is powered on; and using a second management mode to manage the rewritable non-volatile memory module if a shut down command is received from a host system, wherein the second management mode is different from the first management mode and the second management mode executes at least one mandatory processing procedure in background.

24 Claims, 6 Drawing Sheets

Using a first management mode to manage a rewritable non-volatile memory module after the rewritable non-volatile memory module is powered on — S1001

Using a second management mode to manage the rewritable non-volatile memory module if a shut down command is received from a host system — S1003

(51) Int. Cl.
*G06F 3/06* (2006.01)
*G06F 12/02* (2006.01)
*G06F 12/1009* (2016.01)

MEMORY MANAGEMENT METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 105108029, filed on Mar. 16, 2016. The entirety of the above-mentioned patent application is hereby incorporated by reference herein and made a part of this specification.

BACKGROUND

Technical Field

The invention relates to a memory management method, and more particularly, relates to a memory management method for a rewritable non-volatile memory, a memory control circuit unit and a memory storage device using the method.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for said electronic products due to its data non-volatility, low power consumption, small volume, non-mechanical structure and high read/write speed. For these reasons, the flash memory has become an import part of the electronic industries. For example, an eMMC (embedded Multi Media Card) widely adopted in mobile electronic device is one storage device that uses the flash memory as a storage medium.

Generally, the flash memory of a flash memory storage device is divided into a plurality of physical units and these physical units are grouped into a data area and a spare area. The physical units sorted into the data area are used for storing valid data written by a write command, and the physical units in the spare area are used for replacing the physical units of the data area during the execution of the write command. Specifically, when the flash memory storage device intends to perform writing for the physical units of the data area after receiving a write command from a host, the flash memory storage device retrieves one physical unit from the spare, writes to-be-written valid old data in physical units of the data area and to-be-written new data into the physical units retrieved from the spare area, associates the physical units written with the new data to the data area, and erases the physical units originally belonging to the data area and associates the same to the spare area. In order to allow the host to successfully access the physical units stored with data in an alternating manner, the flash memory storage device may provide logical units to the host. In other words, the flash memory storage device may establish a logical to physical mapping table or a physical to logical mapping table, and record and update a mapping relation between the logical unit and the physical unit in the data area to reflect the alternating (or substituting) of the physical units. As such, the host only needs to perform writing with respect to the provided logical units so the flash memory storage device can perform data reading or writing for the mapped physical units according to the logical to physical mapping table or the physical to logical mapping table.

However, as capacity and amount of the physical units become larger with advancements in manufacturing process of the flash memory, size of the mapping table and its required time for updating are increased correspondingly. To overcome said issue, a DRAM (Dynamic Random Access Memory) or a SRAM (Static Random Access Memory) is usually disposed in the flash memory storage device to serve as a cache memory. In this kind of architecture, the flash memory storage device temporarily stores said mapping table in the cache memory in order to improve overall operational efficiency of the system.

In general, if a shut down command is received by a storage device from a host system, the storage device may write aforesaid mapping tables or other system data/file for managing the storage device into the rewritable non-volatile memory of the storage device. However, after the shut down command is received by the storage device, the storage device may need to process one or more write commands before it can be really powered off. Accordingly, the previously stored mapping table or system data/file is unable to truly reflect write operations (e.g., the mapping relation updated in response to the write operation) performed after the shut down command is received. As a result, because it is possible that the previously stored mapping table and system data/file is incorrect, the storage device may enter a processing process of abnormal when the next time it is powered on, which leads to increases in the required time for powering on.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a memory management method for a rewritable non-volatile memory module, a memory control circuit unit and a memory storage device using the method, which are capable of increasing the speed for powering on the system to thereby improve working efficiency.

An exemplary example of the invention provides a memory management method for a rewritable non-volatile memory module, which includes: using a first management mode to manage the rewritable non-volatile memory module after the rewritable non-volatile memory module is powered on; and using a second management mode to manage the rewritable non-volatile memory module if a shut down command is received from a host system, wherein the second management mode is different from the first management mode and the second management mode executes at least one mandatory processing procedure in background.

An exemplary embodiment of the invention provides a memory storage device for controlling a memory storage device. The memory control circuit unit includes a host interface, a memory interface and a memory management circuit. The host interface is coupled to a host system. The memory interface is coupled to the rewritable non-volatile memory module. The memory management circuit is coupled to the host interface and the memory interface. The memory management circuit is configured to use a first management mode to manage the rewritable non-volatile memory module after the rewritable non-volatile memory module is powered on. The memory management circuit is further configured to use a second management mode to manage the rewritable non-volatile memory module if a shut down command is received from a host system. The second management mode is different from the first management mode and the second management mode executes at least one mandatory processing procedure in background.

A memory storage device is provided according to an exemplary embodiment of the invention, and the memory storage device includes a connection interface unit, a rewritable non-volatile memory module and a memory control circuit unit. The connection interface unit is configured to couple to a host system. The memory control circuit unit is coupled to the connection interface unit and the rewritable non-volatile memory module. The memory control circuit unit is configured to use a first management mode to manage the rewritable non-volatile memory module after the rewritable non-volatile memory module is powered on. The memory control circuit unit is further configured to use a second management mode to manage the rewritable non-volatile memory module if a shut down command is received from a host system. The second management mode is different from the first management mode and the second management mode executes at least one mandatory processing procedure in background.

Based on the above, the memory management method for the rewritable non-volatile memory module, the memory control circuit unit and the memory storage device using the method as provided according to the exemplary embodiments of the invention are capable of using the special management mode corresponding to the shut down command to manage the rewritable non-volatile memory module after the shut down command is received, so as to write the system data stored in the cache memory into the rewritable non-volatile memory module in response to the flush command. As a result, the processing procedure caused by incorrect system data (e.g., the processing procedure for recovering the correct system data) may be prevent when the system is powered on the next time, so as to increase the speed of powering on the system to thereby improve working efficiency.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
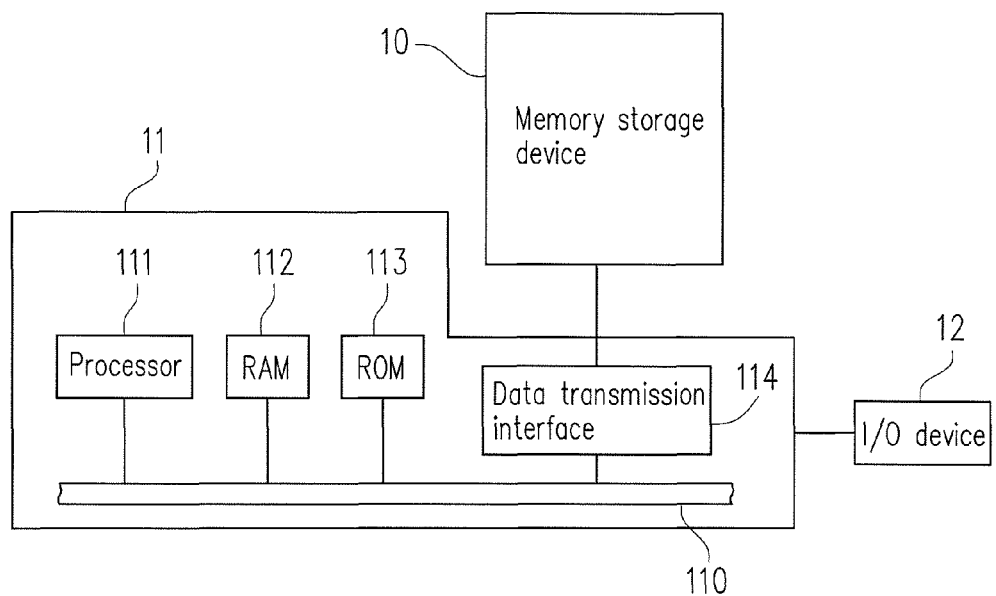
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 2:
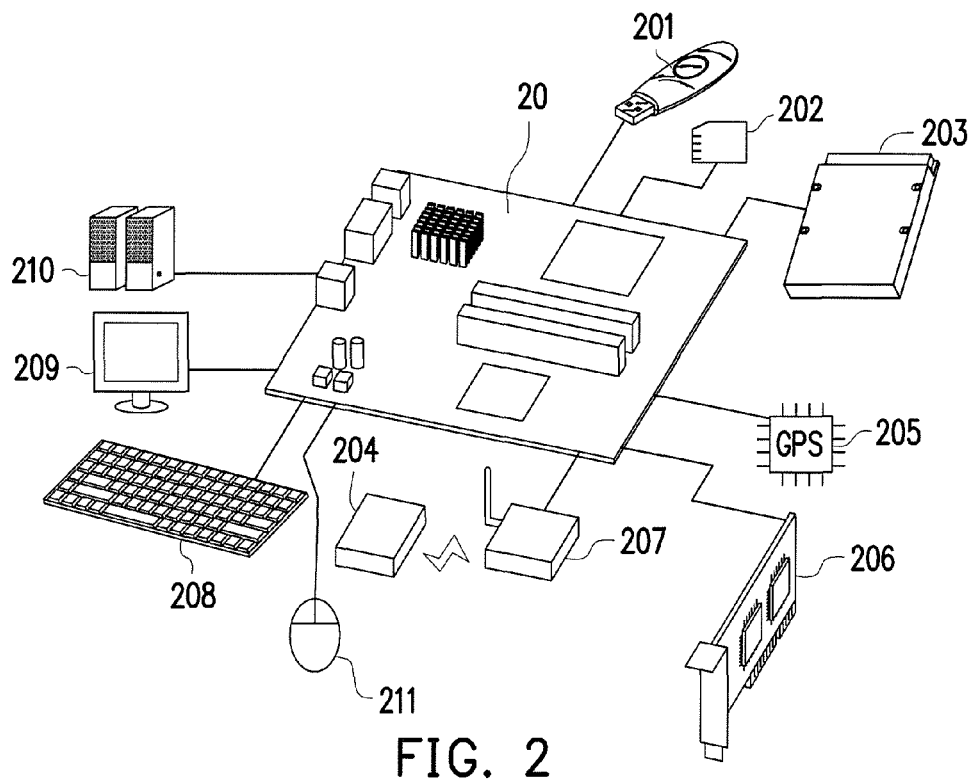
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 may write data into the memory storage device 10 or read data from the memory storage device 10 through the data transmission interface 114. Further, the host system 111 is coupled to an I/O device 12 through the system bus 110. For example, the host system 11 can transmit output signals to the I/O device 12 or receive input signals from I/O device 12 through the system bus 110.

In the present exemplary embodiment, the processor 111, the RAM 112, the ROM 113 and the data transmission interface 114 may be disposed on a main board 20 of the host system 11. A number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209, a speaker 210 and a mouse 211 through the system bus 110. For example, in an exemplary embodiment, the main board 20 may access the wireless memory storage device 204 through the wireless transmission device 207.

Figure 3:
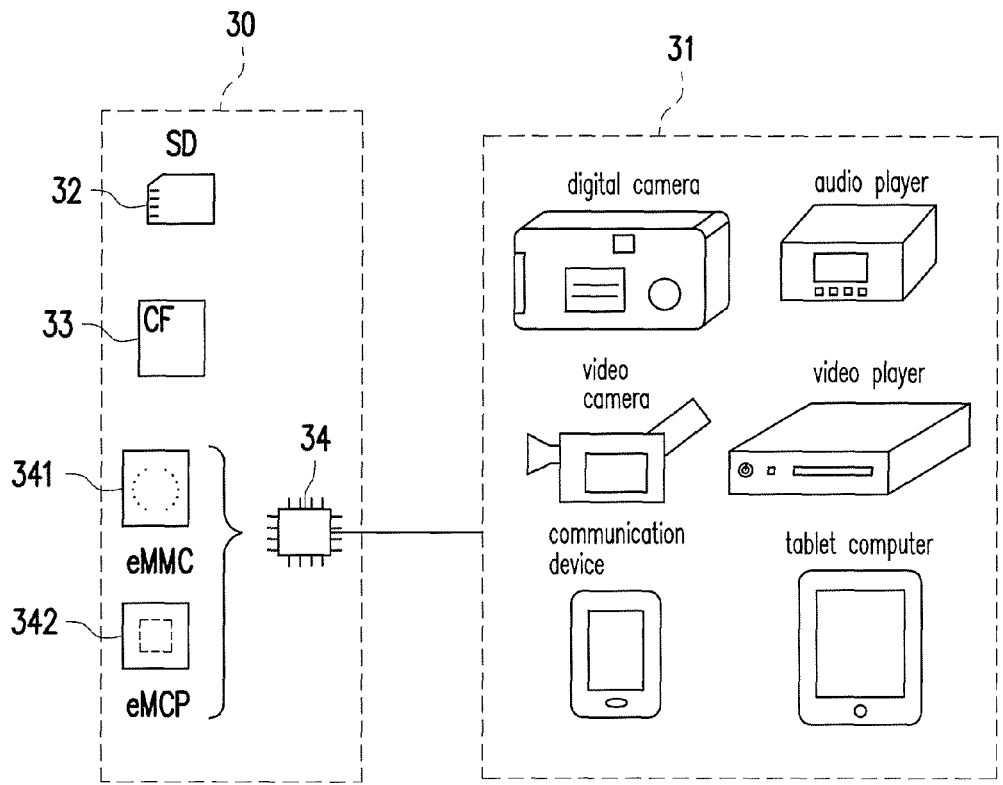
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. The host system is illustrated as a computer system in foregoing exemplary embodiment; nonetheless, FIG. 3 is a schematic diagram illustrating a host system and a memory storage device according to another exemplary embodiment of the invention. Referring to FIG. 3, in another exemplary embodiment, a host system 31 may also be a system including a digital camera, a video camera, a communication device, an audio player, a video player or a tablet computer, whereas a memory storage device 30 can be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
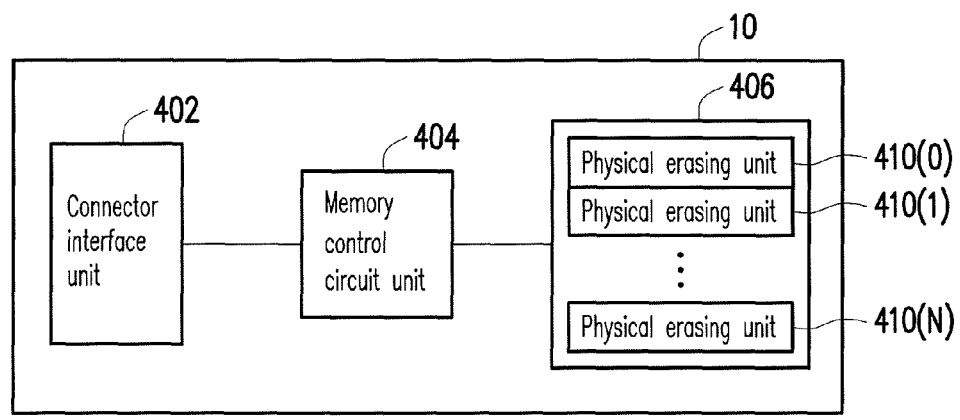
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a SATA (Serial Advanced Technology Attachment) standard. Nevertheless, it should be understood that the invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form, so as to execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit may be constituted by 64 physical programming units, 256 physical programming units or any amount of the physical programming units.

More specifically, the physical erasing unit is a minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 bytes. However, in other exemplary embodiments, the data bit area may also contain more or less physical access addresses, and the number and size of the physical access addresses are not limited by the invention. For example, in one exemplary embodiment, the physical erasing unit is a physical block, and the physical programming unit is a physical page or a physical sector, but the invention is not limited thereto.

In the present exemplary embodiment, the rewritable non-volatile memory module 406 is a MLC (Multi Level Cell) NAND flash memory module (i.e., a flash memory module capable of storing two data bits in one memory cell). However, the invention is not limited thereto. The rewritable non-volatile memory module 406 may also be a SLC (Single Level Cell) NAND flash memory module, (i.e., a flash memory module capable of storing one data bit in one memory cell), a TLC (Trinary Level Cell) NAND flash memory module (i.e., a flash memory module capable of storing three data bits in one memory cell), other flash memory modules or any memory module having the same features.

Figure 5:
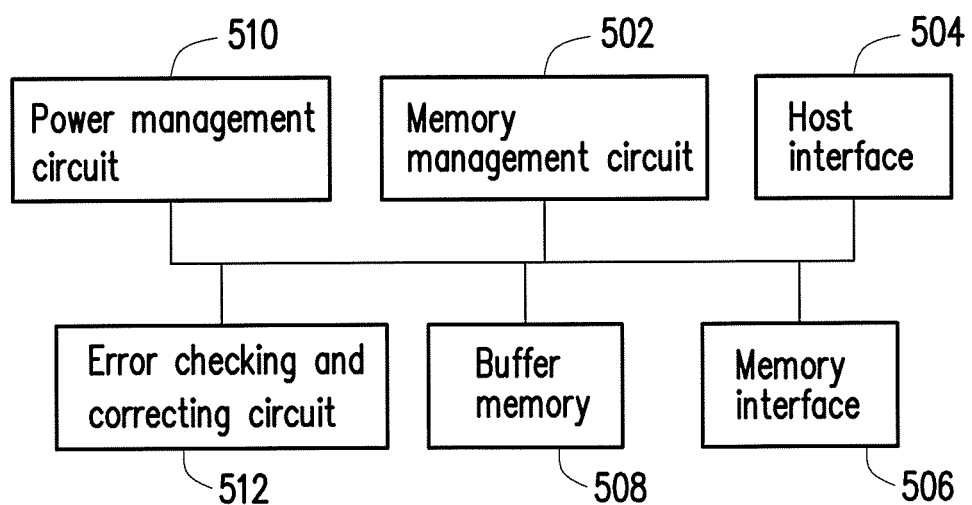
FIG. 5 is a schematic block diagram illustrating a memory control circuit unit according to an exemplary embodiment of the invention.

FIG. 5 is a schematic block diagram illustrating a memory control circuit unit according to an exemplary embodiment.

Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control commands. During operation of the memory storage device 10, the control commands are executed to execute various operations such as writing, reading and erasing data.

In the present exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment of the invention, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). Particularly, the read only memory has an activate code, which is executed by the microprocessor unit to load the control commands stored in the rewritable non-volatile memory module 406 to the random access memory of the memory management circuit 502 when the memory control circuit unit 404 is enabled. Later, the control commands are executed by the microprocessor unit to perform operations of writing, reading or erasing data.

The host interface 504 is coupled to the memory management circuit 502 and configured to couple to the connection interface unit 402, so as to receive and identify commands and data sent from the host system 11. In other words, the commands and the data sent from the host system 11 are passed to the memory management circuit 502 through the host interface 504. In the present exemplary embodiment, the host interface 504 is compatible with the eMMC standard. However, it is to be understood that the invention is not limited thereto. The host interface 504 may also be PATA standard, IEEE 1394 standard, PCI Express standard, UFS standard, UHS-I interface standard, UHS-II interface standard, SD standard, MS standard, SATA standard, CF standard, IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506.

In an exemplary embodiment, the memory control circuit unit 404 further includes a buffer memory 508, a power management circuit 510 and an error checking and correcting circuit 512.

The buffer memory 508 is coupled to the memory management circuit 502 and configured to temporarily store data and commands from the host system 11 or data from the rewritable non-volatile memory module 406. The buffer memory 508 is, for example, a dynamic random access memory or a static random access memory or other memory modules having an access speed faster than that of the rewritable non-volatile memory module 406.

The power management unit 510 is coupled to the memory management circuit 502 and configured to control a power of the memory storage device 10.

The error checking and correcting circuit 512 is coupled to the memory management circuit 502 and configured to execute an error checking and correcting process to ensure the correctness of data. Specifically, when the memory management circuit 502 receives a write command from the host system 11, the error checking and correcting circuit 512 generates an error checking and correcting code (ECC code) for data corresponding to the write command, and the memory management circuit 502 writes data and the ECC code corresponding to the write command to the rewritable non-volatile memory module 406. Subsequently, when the memory management circuit 502 reads the data from the rewritable non-volatile memory module 406, the error checking and correcting code corresponding to the data is also read, and the error checking and correcting circuit 512 may execute the error checking and correcting procedure for the read data according to the error checking and correcting code.

Figure 6:
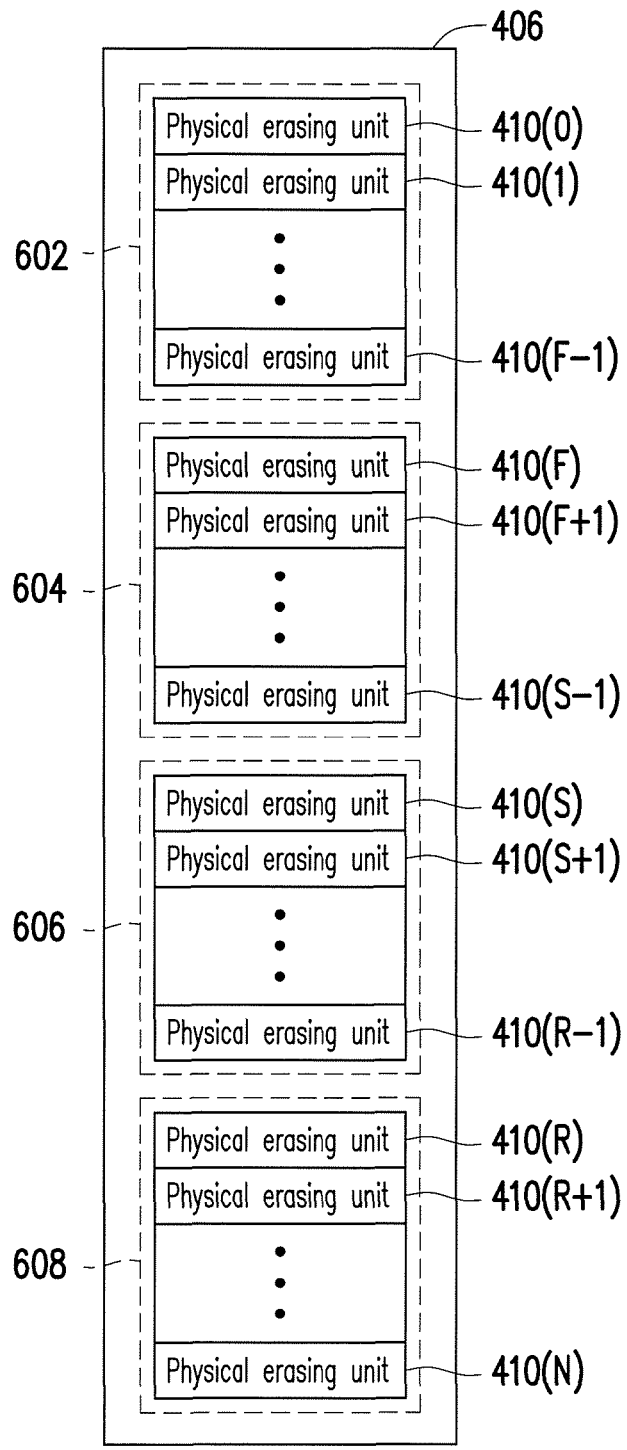
FIG. 6 is a schematic diagram illustrating management of a rewritable non-volatile memory module according to an exemplary embodiment of the invention.

FIG. 6 is a schematic diagram illustrating a management of a rewritable non-volatile memory module according to an exemplary embodiment of the invention.

It should be understood that terms used for describing the operation of the rewritable non-volatile memory module 406, such as "select", "group", "divide", "associate" and so forth, are logical concepts. That is, the physical erasing units of the rewritable non-volatile memory module are logically operated, but actual positions of the physical units of the rewritable non-volatile memory module are not changed.

Referring to FIG. 6, the rewritable non-volatile memory module 406 has a plurality of physical erasing units 410(0) to 410(N), and each of the physical erasing units has a plurality of physical programming units. In the present exemplary embodiment, the physical programming unit is a minimum unit for programming. That is, the programming unit is the minimum unit for writing data. For example, the physical programming unit is a physical page or a physical sector. When the physical programming unit is the physical page, each physical programming unit usually includes a data bit area and a redundancy bit area. The data bit area has multiple physical sectors configured to store user data, and the redundant bit area is configured to store system data (e.g., an error correcting code or other data for managing the system). On the other hand, the physical erasing unit is the minimal unit for erasing. Namely, each physical erasing unit contains the least number of memory cells to be erased together. For instance, the physical erasing unit is a physical block.

The memory controller 404 (or the memory management circuit 502) logically groups the physical erasing units 410(0) to 410(N) of the rewritable non-volatile memory module 406 into a data area 602, a spare area 604, a system area 606 and a replacement area 608.

The physical erasing units logically belonging to the data area 602 and the spare area 604 are used to store data from the host system 11, and the physical erasing units in the data area 602 and the spare area 604 may be mapped to a plurality of logical units of the host system 11 (e.g., the physical blocks of the data area 602 and the spare area 604 are mapped to the logical blocks of the host system 11). Specifically, the physical erasing units of the data area 602 are regarded as the physical erasing units already stored with the data, whereas the physical erasing units of the spare area 604 are configured to replace the physical erasing units of the data area 602. In other words, it is assumed the write command and to-be-written data corresponding to the write command are received by the memory control circuit unit 404 (or the memory management circuit 502) from the host system 11. The write command instructs to store the to-be-written data into at least one first logical unit. In response to the write command, the memory control circuit unit 404 (or the memory management circuit 502) stores the to-be-written data into at least one first physical erasing unit of the rewritable non-volatile memory module 406 mapped to the at least one first logical unit. Alternatively, if the data area 602 does not include any physical erasing unit mapped to the at least one first logical unit, the memory control circuit unit 404 (or the memory management circuit 502) may select at least one physical erasing unit from the spare area 604 to serve as the at least one first physical erasing unit, and write the data into the selected at least one first physical erasing unit as replacement to the physical erasing unit of the data area 602.

The physical erasing units logically belonging to the system area 606 are configured to record system data related to the rewritable non-volatile memory module 406. For example, the system data includes a manufacturer and a model number related to the rewritable non-volatile memory module 406, a serial number of memory die belonging to the rewritable non-volatile memory module 406, a number of the physical erasing units, a number of the physical programming units in each physical erasing unit, and the like.

The physical erasing units logically belonging to the replacement area 608 are used in a bad physical erasing unit replacement procedure for replacing damaged physical erasing units. More specifically, if the replacement area 608 still includes a normal physical erasing unit and the physical erasing unit of the data area 602 is damaged, the memory control circuit unit 404 (or the memory management unit 502) may select the normal physical erasing unit from the replacement area 608 for replacing the damaged physical erasing unit.

Particularly, the numbers of the physical erasing units in the data area 602, the spare area 604, the system area 606 and the replacement area 608 of the rewritable non-volatile memory module 406 may be different from one another according to the different memory specifications. In addition, it should be understood that, during operation of the memory storage device 10, grouping relations of the physical erasing units for associating with the data area 602, the spare area 604, the system area 606, and the replacement area 608 may be dynamically changed. For example, when the damaged physical erasing units in the spare area 604 are replaced by the physical erasing units in the replacement area 608, the physical erasing units originally from the replacement area 608 are then associated with the spare area 604. Alternatively, after selecting the physical erasing unit from the spare area 604 for storing the data, the memory control circuit unit 404 (or the memory management circuit 502) associates that physical erasing unit to the data area 602 and maps the logical unit corresponding to the written data to that physical erasing unit.

Figure 7:
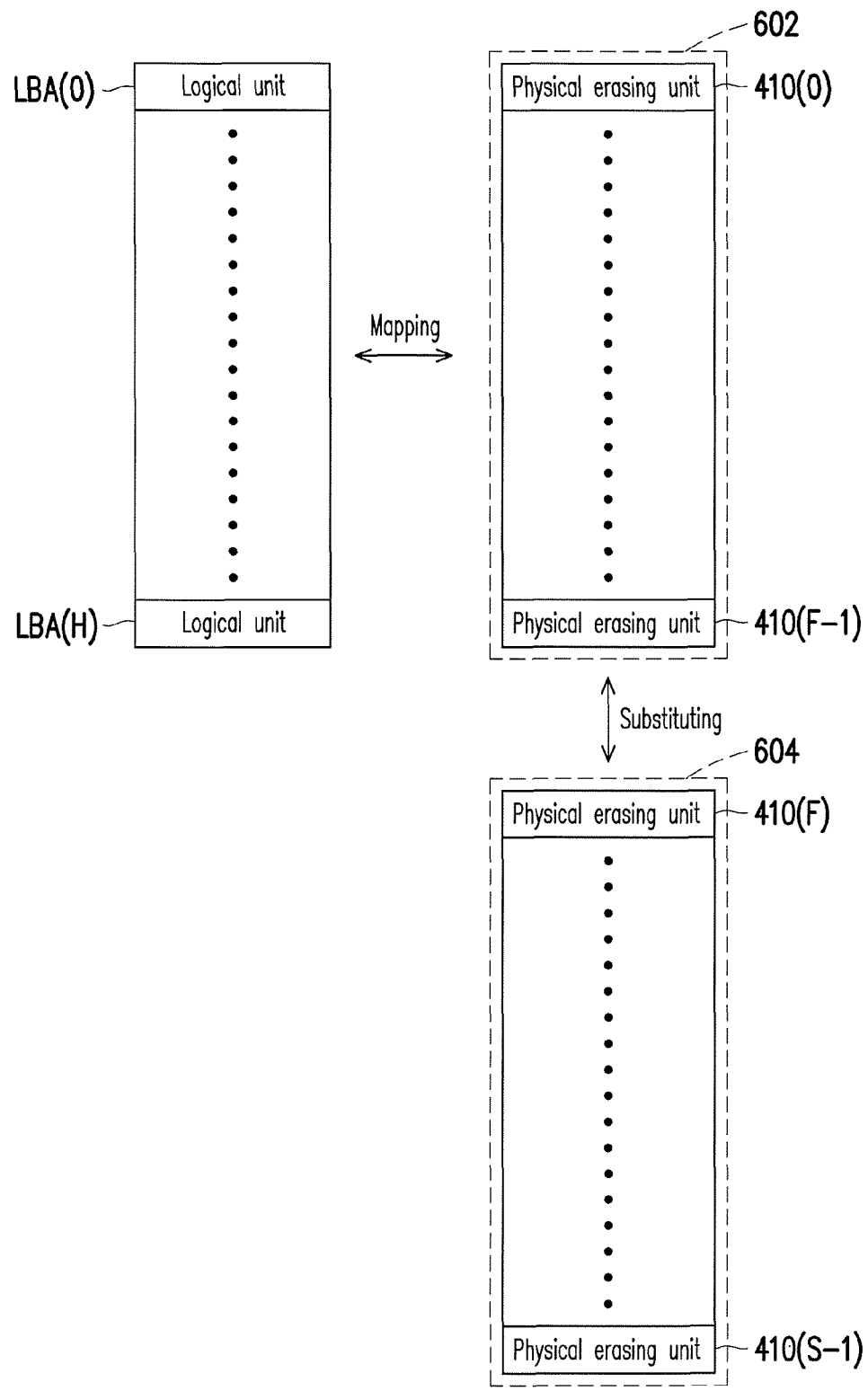
FIG. 7 is a schematic diagram illustrating management of a rewritable non-volatile memory module according to an exemplary embodiment of the invention.

FIG. 7 is a schematic diagram illustrating a management of a rewritable non-volatile memory module according to an exemplary embodiment of the invention. Management architecture of the rewritable non-volatile memory module is described below with reference to FIG. 6 and FIG. 7.

Referring to FIG. 7, it is assumed that the memory control circuit unit 404 (or the memory management circuit 502) already assigns logical units LBA(0) to LBA(H) for mapping to the physical erasing units 410(0) to 410(F-1) of the data area 602, and the host system 11 accesses the data in the data area 602 through the logical units LBA(0) to LBA(H). Herein, each of the logical units LBA(0) to LBA(H) may be constituted by one or more logic addresses. For example, the logic unit may be a logical block, a logical page or a logical sector. One logical unit may be mapped to one or more physical units, wherein the physical unit may be one or more physical addresses, one or more physical sectors, one or more physical programming units, or one or more physical erasing units.

In the present exemplary embodiment, the memory control circuit unit 404 (or the memory management circuit 502) establishes system data for managing the memory storage device 10 and stores the system data into the buffer memory for accessing. For instance, the memory control circuit unit 404 (or the memory management circuit 502) establishes a logical to physical address mapping table and a physical to logical address mapping table to record a mapping relation between the logical unit (e.g., the logical block, the logical page or the logical sector) and the physical unit (e.g., the physical erasing unit, the physical programming unit or the physical sector). In other words, the memory control circuit unit 404 (or the memory management circuit 502) may look up for the physical unit mapped to one logical unit by using the logical to physical address mapping table, and the memory control circuit unit 404 (or the memory management circuit 502) may look up for the logical unit mapped to one physical unit by using the physical to logical address mapping table. When the memory control circuit unit 404 (or the memory management unit 502) intends to update the mapping relation for one specific logical unit, the logical to physical address mapping table corresponding to the specific logical unit is loaded into the buffer memory for updating. Similarly, the memory control circuit unit 404 also correspondingly updates the physical to logical address mapping table.

In the present exemplary embodiment, the memory control circuit unit 404 (or the memory management circuit 502) may directly establish said mapping tables (e.g., the logical to physical address mapping table and the physical to logical address mapping table) in the buffer memory 508, or read the mapping tables from rewritable non-volatile memory module 406 and store them into the buffer memory 508. Accordingly, the access speed of the buffer memory 508 may be far higher than that of the rewritable non-volatile memory module 406. Therefore, efficiency for maintaining/updating/accessing the mapping table may be improved by storing the mapping tables in the buffer memory 508. In another embodiment, the memory control circuit unit 404 (or the memory management circuit 502) may also store the mapping tables into other suitable memories. Further, in another embodiment, the memory control circuit unit 404 (or the memory management circuit 502) may also temporarily store other system data for managing the memory storage device 10 into the buffer memory 508 in order to improve efficiency for maintaining/updating/accessing the system data stored in the buffer memory 508.

However, in general, the data stored in the buffer memory 508 will disappear when the buffer memory 508 is powered off. Therefore, before the buffer memory 508 is powered off (e.g., a shut down operation performed by the memory storage device 10), the memory control circuit unit 404 (or the memory management circuit 502) writes the data (e.g., user data from the host system 11 and the system data for managing the memory storage device 10) stored in the buffer memory 508 into the rewritable non-volatile memory module 406. Accordingly, the next time when the memory storage device 10 is powered on (e.g., when power is supplied to the memory storage device 10 and the memory storage device is enabled with the supplied power), the system data stored in the rewritable non-volatile memory module 406 may be loaded into the buffer memory 508. A memory management method related to a power off operation of the memory storage device provided by the present exemplary embodiment is described in detail below with reference to FIG. 8 and FIG. 9.

Figure 8:
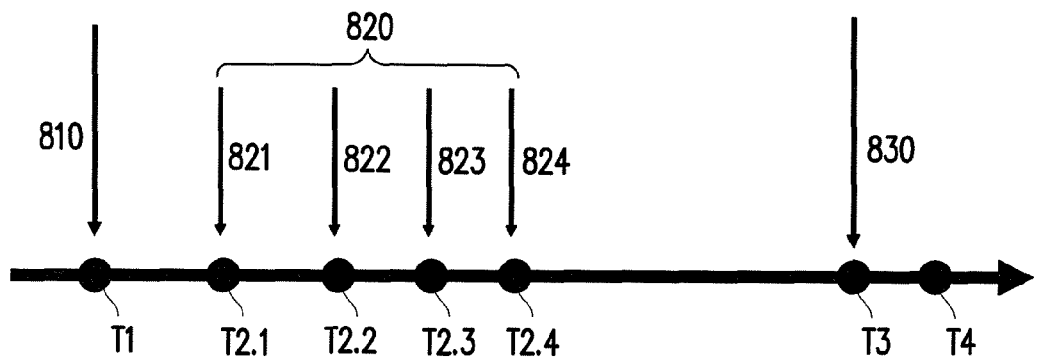
FIG. 8 is a schematic diagram illustrating the power off operation of the memory storage device according to an exemplary embodiment of the invention.
Figure 9:
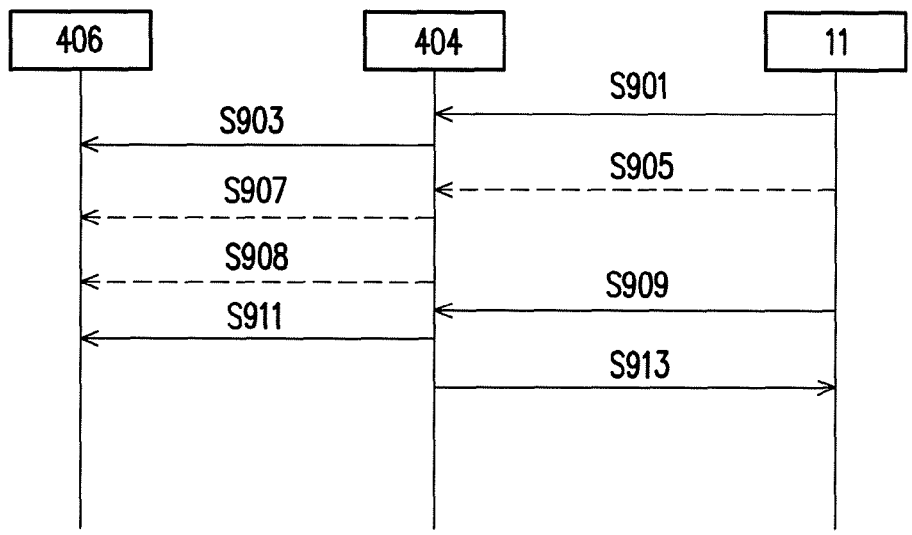
FIG. 9 is a flowchart illustrating operation of the power off operation of the memory storage device according to an exemplary embodiment of the invention.

FIG. 8 is a schematic diagram illustrating the power off operation of the memory storage device according to an exemplary embodiment of the invention. FIG. 9 is a flowchart illustrating operation of the power off operation of the memory storage device according to an exemplary embodiment of the invention.

In the present exemplary embodiment, referring to FIG. 8, for instance, it is assumed that the memory control circuit unit 404 (or the memory management circuit 502) receives a shut down command 810, commands 821, 822, 823 and 824 (collectively referred as a commands 820) and a flush command 830 in accordance with the order of times T1, T2.1, T2.2, T2.3, T2.4 and T3. It should be noted, the invention is not intended to limit the number of the commands 820 received from the host system 11 after the shut down command 810 is received. In other words, the memory control circuit unit 404 (or the memory management circuit 502) may receive one or more commands 820 after receiving the shut down command 810. A time T4 is used to indicate a time point when the host system 11 stops supplying power to the memory storage device 10.

In the present exemplary embodiment, the shut down command 810 is configured to instruct for powering off the memory storage device 10. For example, the host system 11 may issue the shut down command 810 to the memory storage device 10 when the host system 11 performs the shut down operation or when the host system 11 enters a specific power state (e.g., a system hibernation, a system sleep, etc.). Later, the host system 11 is ready to cut off the power supplied to the memory storage device 10.

As described above, the data stored in the buffer memory 508 will disappear when the buffer memory 508 is powered off. In the present exemplary embodiment, if the shut down command 810 is received, the memory control circuit unit 404 (or the memory management circuit 502) writes the system data (also known as second system data) stored in the buffer memory 508 into the rewritable non-volatile memory module 406. It is worth mentioning that, the second system data stored into the rewritable non-volatile memory module 406 in response to the shut down command 810 includes said mapping tables (e.g., the logical to physical address mapping table and the physical to logical address mapping table). However, based on manufacturer's demands, other suitable system data may also be stored into the rewritable non-volatile memory module 406 in response to the shut down command 810.

More specifically, in the present exemplary embodiment, if the shut down command 810 is received from the host system 11, the memory control circuit unit 404 (or the memory management circuit 502) uses one special management mode (also known as a second management mode) to manage the rewritable non-volatile memory module 406. Conversely, after the host system 11 (or an external power source) supplies power to the rewritable non-volatile memory module 406 (or the memory storage device 10), the memory control circuit unit 404 (or the memory management circuit 502) uses a normal management mode (also known as a first management mode) that is different from the special management mode to manage the rewritable non-volatile memory module 406. In other words, the memory control circuit unit 404 (or the memory management circuit 502) may use the first management mode to manage the rewritable non-volatile memory module 406 in response to power-on of the rewritable non-volatile memory module 406 (or the memory storage device 10). The difference between the first management mode and the second management mode is described as follows.

In the present exemplary embodiment, the difference between the first management mode and the second management mode is that, if the memory control circuit unit 404 (or the memory management circuit 502) uses one special management mode (also known as the second management mode) to manage the rewritable non-volatile memory module 406, the memory control circuit unit 404 (or the memory management circuit 502) executes at least one mandatory processing procedure in background. In other words, the memory control circuit unit 404 (or the memory management circuit 502) does not execute the mandatory processing procedure corresponding to the second management mode while using the first management mode to manage the rewritable non-volatile memory module 406.

For instance, it is that assumed that, after the shut down command 810 is received, the memory control circuit unit 404 (or the memory management circuit 502) already uses the second management mode to manage the rewritable non-volatile memory module 406. In this case, if the flush command 830 is received by the memory control circuit unit 404 (or the memory management circuit 502) from the host system 11, the memory control circuit unit 404 (or the memory management circuit 502) "forcibly" writes the system data (hereinafter, also known as first system data) stored in the buffer memory 508 into the rewritable non-volatile memory module 406. It is worth mentioning that, in the present exemplary embodiment, the flush command 830 is configured to instruct for clearing the data in the buffer memory 508. Specifically, when the flush command 830 is received by the memory control circuit unit 404 (or the memory management circuit 502) from the host system 11, the memory control circuit unit 404 (or the memory management circuit 502) writes the user data stored in the buffer memory 508 into the corresponding physical units in the rewritable non-volatile memory module 406, and updates the system data stored in the buffer memory 508 according to the physical addresses being written (e.g., updating the logical to physical address mapping table and/or the physical to logical address mapping table).

In other words, in the second management mode, if the flush command 830 is received by the memory control circuit unit 404 (or the memory management circuit 502) from the host system 11, other than writing the user data and updating the system data (the first system data), the memory control circuit unit 404 (or the memory management circuit 502) also forcibly writes the (updated) first system data stored in the buffer memory 508 into the rewritable non-volatile memory module 406.

Conversely, in the first management mode, if the flush command 830 is received by the memory control circuit unit 404 (or the memory management circuit 502) from the host system 11, the memory control circuit unit 404 (or the memory management circuit 502) writes the user data into the rewritable non-volatile memory module 406 and updates the first system data stored in the buffer memory in response to the flush command. Yet, the memory control circuit unit 404 (or the memory management circuit 502) does not write the (updated) first system data stored in the buffer memory 508 into the rewritable non-volatile memory module 406.

More specifically, in the present exemplary embodiment, after all the system data stored in the buffer memory 508 are updated in response to the flush command in the second management mode, the memory control circuit unit 404 (or the memory management circuit 502) writes the system data stored in the buffer memory 508 into the rewritable non-volatile memory module 406. For example, the memory control circuit unit 404 (or the memory management circuit 502) may write all the system data or the specific system data (e.g., the first system data) into the physical erasing units divided to the system area in the rewritable non-volatile memory module 406, or write all the system data or the specific system data (e.g., the first system data) into one specific physical erasing unit in the rewritable non-volatile memory module 406. Herein, the specific physical erasing unit is a physical erasing unit preset for storing the system data.

It is worth mentioning that, as described above, the first system data and the second system data may be the mapping tables (e.g., the logical to physical address mapping table and/or the physical to logical address mapping table). However, the difference between the first system data and the second system data is that, the second system data is the system data being stored in response to the shut down command 810, whereas the first system data is the system data being stored in response to the flush command.

In the present exemplary embodiment, the commands 820 includes, for example, a write command which is configured to instruct for writing the user data into the memory storage device 10. The write command may include the user data to be written and information which instructs for storing the user data (e.g., the logical addresses for storing the user data).

However, in another exemplary embodiment, the commands 820 further includes a system command (e.g., a garbage collection command), which is configured to instruct for performing a system operation in background for the rewritable non-volatile memory module 406. In other words, the commands 820 may also be regarded as system commands 821 to 824 executed for the rewritable non-volatile memory module 406 at the times T2.1 to T2.4, respectively. In addition, the mapping relation between the logical units and the physical units would be changed due to a garbage collection operation performed for the rewritable non-volatile memory module 406 according to the garbage collection command. Therefore, the memory control circuit unit 404 (or the memory management circuit 502) further updates said mapping tables or other corresponding system data temporarily stored in the buffer memory 508 according to the mapping relation between the logical units and the physical units after completing the garbage collection operation. In other words, in this embodiment, the write command from the host system 11 or other system commands from the memory control circuit unit 404 (or the memory management circuit 502) may affect the mapping tables or other system data corresponding to the system command temporarily stored in the buffer memory 508. It should be noted that, the number of the commands 820 may be one or more, and the commands 820 may include said system command and the write command at the same time.

Further, in another exemplary embodiment, it is assumed that the command 820 is a system command 820. The mandatory processing procedure includes adjusting a wait time for executing the system command 820 by the memory control circuit unit 404 (or the memory management circuit 502) in the second management mode. In the present exemplary embodiment, the system command is executed according to the wait time.

For example, it is assumed that the system command is the garbage collection command configured to instruct for performing the garbage collection operation to the rewritable non-volatile memory module 406 in background. The memory control circuit unit 404 (or the memory management circuit 502) executes the garbage collection command according to the wait time corresponding to the garbage collection command. More specifically, the memory control circuit unit 404 (or the memory management circuit 502) may execute the garbage collection command when a time in which the memory storage device 10 is in an idle state (e.g., in which no operation is performed) exceeds the wait time.

As another example, in another exemplary embodiment, if the memory control circuit unit 404 (or the memory management circuit 502) determines to execute the garbage collection command, according to the current wait time, the memory control circuit unit 404 (or the memory management circuit 502) executes the garbage collection command only after the wait time is over. It should be noted that, the manufacturer may preset a length of the wait time.

Further, in the operation of adjusting the wait time for executing the system command 820 by the memory control circuit unit 404 (or the memory management circuit 502), the memory control circuit unit 404 (or the memory management circuit 502) adjusts the wait time according to a period from receiving the shut down command from the host system to the host system stopping supplying power so that the wait time would be greater than said period.

More specifically, after the shut down command is received from the host system 11, the memory control circuit unit 404 (or the memory management circuit 502) identifies (or records) a time (period) between a time point when the shut down command is received and a time point when the host system 11 really stops supplying power. And then, the memory control circuit unit 404 (or the memory management circuit 502) adjusts the wait time according to said time (period). Specifically, the memory control circuit unit 404 (or the memory management circuit 502) may adjust the wait time to be greater than said time (period) according to said time (period) (i.e., the time between the time point when the shut down command is received and the time point when the host system 11 really stops supplying power). Accordingly, since the wait time corresponding to the system command 820 is adjusted, the memory control circuit unit 404 (or the memory management circuit 502) does not execute the system command 820 during the period from receiving the shut down command from the host system 11 to the host system 11 stopping supplying power. As such, the system data stored in the buffer memory 508 would not be affected (updated) because of the execution of the system command 820. In other words, accordingly, the system data (e.g., the second system data) stored in response to the received shut down command 810 does not become invalid (or expired) due to the system command 820 executed after the shut down command 810, so that the valid system data already stored in the rewritable non-volatile memory module 406 may be used when the memory storage device 10 is powered on next time.

Referring to FIG. 8 and FIG. 9 together, for instance, in an operation S901, at the time T1, the host system 11 sends the shut down command 810 to the memory control circuit unit 404. In an operation S903, after the shut down command 810 is received, the memory control circuit unit 404 writes at least one system data (also known as the second system data) stored in the buffer memory 508 into the rewritable non-volatile memory module 406 in response to the shut down command 810, and uses the second management mode to manage the rewritable non-volatile memory module 406.

Next, in an operation S905, the memory control circuit unit 404 receives at least one write command (e.g., the commands 821 to 824 corresponding to the times T2.1 to T2.4) from the host system 11. The write command 820 is configured to instruct for writing the user data into the rewritable non-volatile memory module 406. In an operation S907, the memory control circuit unit 404 writes the user data corresponding to the at least one write command 820 into the rewritable non-volatile memory module 406 in response to the at least one write command 820. In an operation S908, the memory control circuit unit 404 performs at least one system operation for the rewritable non-volatile memory module 406 according to the at least one system command. It should be noted that, the operations S905, S907 and S908 are optional (i.e., they may not be performed). In addition, a sequence for executing the operations S905, S907 and S908 is changeable.

For example, the memory control circuit unit 404 first receives the write command from the host system 11 (S905). Next, the memory control circuit unit 404 executes the system command (e.g., garbage collection command) (S908). Later, after the system operation (e.g., garbage collection operation) corresponding to the system command is completed, the memory control circuit unit 404 then writes the user data corresponding to the write command into the rewritable non-volatile memory module 406 (S907). As another example, the memory control circuit unit 404 may first perform the operation S908 followed by the operation S905, and then perform the operation S907.

In an operation S909, the host system 11 sends the flush command 830 to the memory control circuit unit 404. In an operation S911, the memory control circuit unit 404 writes the user data stored in the buffer memory 508 and the system data stored in the buffer memory 508 into the rewritable non-volatile memory module 406. After writing the user data and the system data into the rewritable non-volatile memory module 406, the memory control circuit unit 404 may send a response to notify the host system 11 that the flush command 830 is completed in an operation S913.

Figure 10:
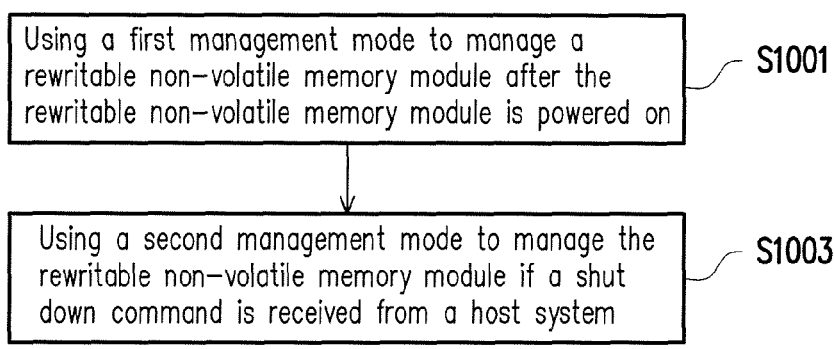
FIG. 10 is a flowchart illustrating a memory management method according to an exemplary embodiment of the invention.

FIG. 10 is a flowchart illustrating a memory management method according to an exemplary embodiment of the invention.

Referring to FIG. 10, in step S1001, the memory control circuit unit 404 (or the memory management circuit 502) uses the first management mode to manage the rewritable non-volatile memory module after the rewritable non-volatile memory module is powered on. In step S1003, if the shut down command is received from the host system, the memory control circuit unit 404 (or the memory management circuit 502) uses the second management mode to manage the rewritable non-volatile memory module.

In summary, the memory management method for the rewritable non-volatile memory module, the memory control circuit unit and the memory storage device using the method as provided according to the exemplary embodiments of the invention are capable of using the special management mode corresponding to the shut down command to manage the rewritable non-volatile memory module after the shut down command is received, so as to write the system data stored in the cache memory into the rewritable non-volatile memory module in response to the flush command. As a result, the processing procedure caused by incorrect system data may be prevent when the system is powered on the next time, so as to increase the speed of powering on the system to thereby improve working efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a rewritable non-volatile memory module, and the memory management method comprising:
    using a first management mode to manage the rewritable non-volatile memory module after the rewritable non-volatile memory module is powered on; and
    using a second management mode to manage the rewritable non-volatile memory module if a shut down command is received from a host system,
    wherein the second management mode is different from the first management mode and the second management mode executes at least one mandatory processing procedure in background,
    wherein, after the shut down command is received from the host system, one or more write commands are received from the host system, and user data corresponding to the one or more write commands are written into the rewritable non-volatile memory module, and after the user data is written, system data corresponding to the written user data in a memory is written into the rewritable non-volatile memory module.

2. The memory management method of claim 1, wherein the at least one mandatory processing procedure comprises:
    forcibly writing at least one first system data stored in the memory into the rewritable non-volatile memory module if a flush command is received from the host system, wherein the flush command is configured to write at least one user data temporarily stored in the memory into the rewritable non-volatile memory module.

3. The memory management method of claim 2, wherein the at least one first system data comprises a mapping table.

4. The memory management method of claim 1, wherein the step of using the first management mode to manage the rewritable non-volatile memory module comprises:
    not writing at least one first system data stored in a memory into the rewritable non-volatile memory module if a flush command is received from the host system, wherein the flush command is configured to write at least one user data temporarily stored in the memory into the rewritable non-volatile memory module.

5. The memory management method of claim 1, wherein the at least one mandatory processing procedure comprises:
    adjusting a wait time for executing at least one system command, wherein the at least one system command is configured to instruct for performing at least one system operation in background to the rewritable non-volatile memory module, wherein the at least one system command is executed according to the wait time.

6. The memory management method of claim 5, wherein the at least one system operation is a garbage collection operation.

7. The memory management method of claim 5, wherein the step of adjusting the wait time for executing the at least one system command comprises:
adjusting the wait time according to a period from receiving the shut down command from the host system to the host system stopping supplying power so that the wait time is greater than the period.

8. The memory management method of claim 1, further comprising:
writing at least one second system data into the rewritable non-volatile memory module in response to the shut down command.

9. A memory control circuit unit or controlling a memory storage device, and the memory control circuit unit comprising:
a host interface, coupled to a host system;
a memory interface, coupled to a rewritable non-volatile memory module;
a memory management circuit, coupled to the host interface and the memory interface, wherein the memory management circuit is configured to use a first management mode to manage the rewritable non-volatile memory module after the rewritable non-volatile memory module is powered on,
wherein the memory management circuit is further configured to use a second management mode to manage the rewritable non-volatile memory module if a shut down command is received from the host system,
wherein the second management mode is different from the first management mode and the second management mode executes at least one mandatory processing procedure in background,
wherein, after the shut down command is received from the host system, the memory management circuit receives one or more write commands from the host system, and the memory management circuit writes user data corresponding to the one or more write commands into the rewritable non-volatile memory module, and after the user data is written, the memory management circuit writes system data corresponding to the written user data in a memory into the rewritable non-volatile memory module.

10. The memory control circuit unit of claim 9, wherein the at least one mandatory processing procedure comprises:
forcibly writing at least one first system data stored in the memory into the rewritable non-volatile memory module by the memory management circuit if a flush command is received from the host system, wherein the flush command is configured to write at least one user data temporarily stored in the memory into the rewritable non-volatile memory module.

11. The memory control circuit unit of claim 10, wherein the at least one first system data comprises a mapping table.

12. The memory control circuit unit of claim 9, wherein in the operation of using the first management mode to manage the rewritable non-volatile memory module,
the memory management circuit does not write at least one first system data stored in a memory into the rewritable non-volatile memory module if a flush command is received from the host system, wherein the flush command is configured to write at least one user data temporarily stored in the memory into the rewritable non-volatile memory module.

13. The memory control circuit unit of claim 9, wherein the at least one mandatory processing procedure comprises:
adjusting a wait time for executing at least one system command by the memory management circuit, wherein the at least one system command is configured to instruct for performing at least one system operation in background to the rewritable non-volatile memory module, wherein the at least one system command is executed according to the wait time.

14. The memory control circuit unit of claim 13, wherein the at least one system operation is a garbage collection operation.

15. The memory control circuit unit of claim 13, wherein in the operation of adjusting the wait time for executing the at least one system command by the memory management circuit,
the memory management circuit adjusts the wait time according to a period from receiving the shut down command from the host system to the host system stopping supplying power so that the wait time is greater than the period.

16. The memory control circuit unit of claim 9, wherein the memory management circuit writes at least one second system data into the rewritable non-volatile memory module in response to the shut down command.

17. A memory storage device, comprising:
a connection interface unit, configured to couple to a host system;
a rewritable non-volatile memory module; and
a memory control circuit unit, coupled to the connection interface unit and the rewritable non-volatile memory module, wherein the memory control circuit unit is configured to use a first management mode to manage the rewritable non-volatile memory module after the rewritable non-volatile memory module is powered on,
wherein the memory control circuit unit is further configured to use a second management mode to manage the rewritable non-volatile memory module if a shut down command is received from the host system,
wherein the second management mode is different from the first management mode and the second management mode executes at least one mandatory processing procedure in background,
wherein, after the shut down command is received from the host system, the memory control circuit unit receives one or more write commands from the host system, and the memory control circuit unit writes user data corresponding to the one or more write commands into the rewritable non-volatile memory module, and after the user data is written, the memory control circuit unit writes system data corresponding to the written user data in a memory into the rewritable non-volatile memory module.

18. The memory storage device of claim 17, wherein the at least one mandatory processing procedure comprises:
forcibly writing at least one first system data stored in the memory into the rewritable non-volatile memory module by the memory control circuit unit if a flush command is received from the host system, wherein the flush command is configured to write at least one user data temporarily stored in the memory into the rewritable non-volatile memory module.

19. The memory storage device of claim 18, wherein the at least one first system data comprises a mapping table.

20. The memory storage device of claim 17, wherein in the operation of using the first management mode to manage the rewritable non-volatile memory module, the memory control circuit unit does not write at least one first system data stored in a memory into the rewritable non-volatile memory module if a flush command is received from the host system, wherein the flush command is configured to write at least one user data temporarily stored in the memory into the rewritable non-volatile memory module.

21. The memory storage device of claim 17, wherein the at least one mandatory processing procedure comprises:
adjusting a wait time for executing at least one system command by the memory control circuit unit, wherein the at least one system command is configured to instruct for performing at least one system operation in background to the rewritable non-volatile memory module, wherein the at least one system command is executed according to the wait time.

22. The memory storage device of claim 21, wherein the at least one system operation is a garbage collection operation.

23. The memory storage device of claim 21, wherein in the operation of adjusting the wait time for executing the at least one system command by the memory control circuit unit,
the memory control circuit unit adjusts the wait time according to a period from receiving the shut down command from the host system to the host system stopping supplying power so that the wait time is greater than the period.

24. The memory storage device of claim 17, wherein the memory control circuit unit writes at least one second system data into the rewritable non-volatile memory module in response to the shut down command.

* * * * *